United States Patent [19]
Fleischer et al.

[11] Patent Number: 5,731,105
[45] Date of Patent: Mar. 24, 1998

[54] BATTERY ELECTROCHEMICAL CELL WITH A NON-LIQUID ELECTROLYTE

[75] Inventors: Niles A. Fleischer, Rehovot; Joel Lang, Givatayim; Eli Rosh Chodesh, Lezion, all of Israel

[73] Assignee: E.C.R. - Electro-Chemical Research Ltd., Yaune, Israel

[21] Appl. No.: 718,833

[22] Filed: Sep. 24, 1996

Related U.S. Application Data

[63] Continuation of Ser. No. 399,017, Mar. 6, 1995, Pat. No. 5,580,681, which is a continuation-in-part of Ser. No. 208,326, May 2, 1994, Pat. No. 5,512,391, which is a continuation-in-part of Ser. No. 128,497, Sep. 7, 1993, Pat. No. 5,382,481.

[51] Int. Cl.$^6$ .................................................. H01M 10/40
[52] U.S. Cl. .................... 429/192; 429/213; 429/220; 429/221; 429/224
[58] Field of Search .............................. 429/192, 213, 429/33, 224, 221, 220

[56] References Cited

U.S. PATENT DOCUMENTS

| | | | |
|---|---|---|---|
| 4,594,297 | 6/1986 | Polak et al. | 429/13 |
| 4,847,174 | 7/1989 | Palmer et al. | 429/112 |
| 5,382,481 | 1/1995 | Fleischer | 429/192 |
| 5,512,391 | 4/1996 | Fleischer | 429/213 |
| 5,580,681 | 12/1996 | Fleischer | 429/192 |

*Primary Examiner*—Stephen Kalafut
*Attorney, Agent, or Firm*—Mark M. Friedman

[57] ABSTRACT

A non-liquid electrolyte containing battery power source which operates efficiently at room temperature. The battery includes (1) a non-liquid electrolyte in which protons are mobile, (2) an anode active material based on an organic compound which is a source of protons during battery discharge, or an anode active material including a metal whose cation can assume at least two different non-zero oxidation numbers and (3) a solid cathode including a compound which forms an electrochemical battery couple with the anode. Anode and cathode active materials can be chosen so that the battery has the feature that the electrochemical reactions at the anode and cathode are at least partially reversible. It is suitable for electronic consumer products, biomedical applications, electric vehicle applications, and the like. The battery can be fabricated in any desired shape or size without any special production precautions. An important feature of the battery is that no thermal activation is required for its operation, therefore, the battery efficiently operates under ambient temperatures.

75 Claims, 1 Drawing Sheet

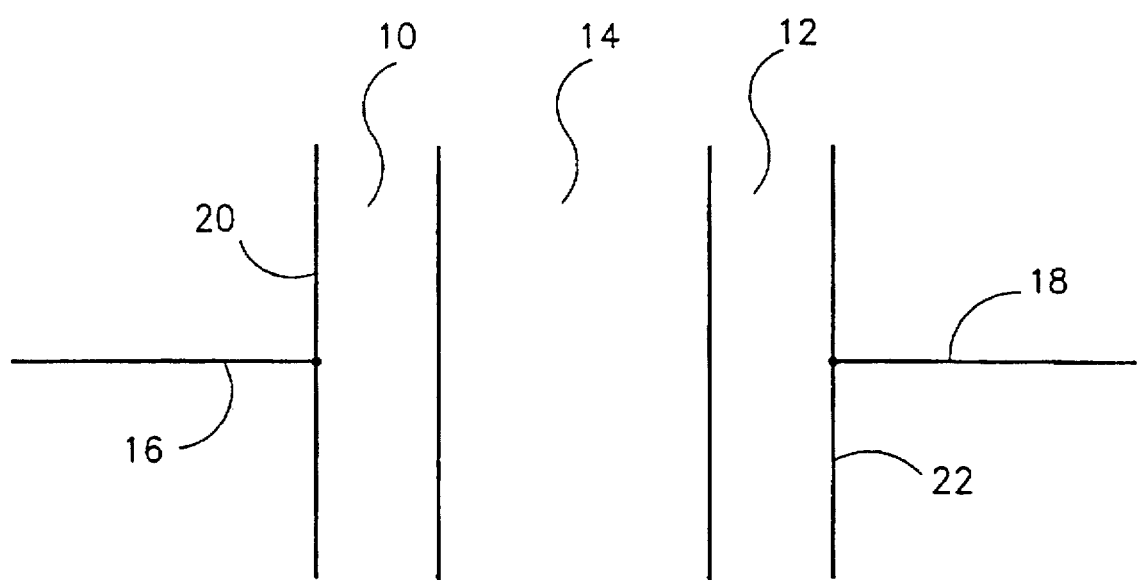
FIGURE

BATTERY ELECTROCHEMICAL CELL WITH A NON-LIQUID ELECTROLYTE

This is a continuation-in-part of U.S. patent application Ser. No. 08/399,017, filed Mar. 6, 1995, now U.S. Pat. No. 5,580,681, which is a continuation-in-part Ser. No. 08/208,326 of U.S. Pat. No. 5,512,391, issued Apr. 30, 1996, which is a continuation-in-part Ser. No. 08/128,497 of U.S. Pat No. 5,382,481, issued Jan. 17, 1995.

FIELD AND BACKGROUND OF THE INVENTION

This invention relates to electrochemical cells which are used as battery power sources by converting chemical energy to electrical energy. More particularly, this invention relates to batteries which accomplish the conversion of chemical energy to electrical energy at ambient temperature by using a non-liquid electrolyte in which protons are mobile, which batteries require no thermal activation for their operation.

Batteries have been developed which contain a solid rather than liquid electrolyte, since these exhibit practical advantages such as a high form factor, thin, flat, flexible shapes and avoidance of fluid leakage or drying out. However, some of these batteries employ electrodes composed of metals, such as palladium (see for example U.S. Pat. No. 4,894,301), which are expensive, or materials which may be dangerous to health and difficult to manufacture. Other batteries release hydrogen ions from a metal alloy or metal hydride anode material in a liquid electrolyte battery such as a nickel-metal hydride cell. Other batteries require thermal activation in order to release hydrogen ions from the anode via deintercalation of protons from the anode (see for example U.S. Pat. No. 4,847,174).

In the past, aromatic nitro compounds were considered for active battery cathode materials in non-rechargeable batteries and only for liquid aqueous electrolytes (see for instance U.S. Pat. No. 2,306,927, Dec. 29, 1942, U.S. Pat. No. 3,025,336, Mar. 13, 1962, R. Glicksman and C. K. Morehouse, J. Electrochem. Soc., 105 (1958) 299 and R. Udhayan and D. P. Bhatt, J. Electrochem. Soc., 140 (1993) L58). Since these compounds are reduced irreversibly under these conditions, they are not suitable for rechargeable batteries. In addition, these compounds suffer from one or more of the following deficiencies: low cell voltages, toxic, significant solubility in the electrolyte, instability with regards to the electrolyte, poor shelf-life, high self-discharge, and low power density.

Further prior art considered the halogenated organic compounds for active battery cathode materials because of their generally higher voltage but only in non-rechargeable batteries and only for liquid aqueous electrolytes (U.S. Pat. No. 2,874,079, Feb. 17, 1959 and R. Udhayan and D. P. Bhatt, J. Electrochem. Soc., 140 (1993) L58). Besides the disadvantages mentioned above for the aromatic nitro compounds, the halogenated compounds also suffer from being corrosive, give chlorine odors and are difficult to handle. In still more recent prior art, some quinone compounds have been used as anodes in liquid aqueous electrolyte batteries (see for instance H. Alt, et. al., Electrochim. Acta, 17 (1972) 873 and F. Beck, et. al., The Electrochemical Society Abstracts, No. 152, October 1994 Meeting). However inherent deficiencies limit their applicability in practical batteries. These electrode materials are not stable with respect to the liquid electrolyte and so they degrade. In addition, these electrode materials are soluble in liquid electrolytes and so the integrity of the electrodes is significantly diminished and there is high self-discharge and poor shelf life. Furthermore, they are not useful in practical batteries because their voltages are generally too low.

SUMMARY OF THE INVENTION

The invention serves to provide an ambient (i.e., room) temperature operateable battery containing a non-liquid proton conductor electrolyte, in which there is employed an anode free of elemental metals and/or alloys thereof and which contains a solid organic compound which is a source of protons during discharge, thus achieving the advantages of non-liquid electrolytes and avoiding the disadvantages of proton-donating elemental metals and/or metal alloy anodes.

Thus, in accordance with the invention, there is provided a battery comprising an anode, a cathode and a non-liquid electrolyte between, and in contact with, the anode and cathode, wherein (a) the anode includes an organic compound which is a source of protons during discharge; (b) the cathode includes a compound which forms an electrochemical battery couple with the anode; and (c) the electrolyte includes a non-liquid material in which protons are mobile.

According to a preferred embodiment of the invention, the organic compound in the anode is a quinone, a non-aromatic ring or chain compound.

In an electrochemically rechargeable version of a battery according to the present invention the anode and cathode active materials are specifically chosen so that the cathode active component reacts at least partially reversibly during battery operation and the anode active component is capable of providing hydrogen ions in an electrochemical reaction to produce electrical energy during battery discharge and to accept hydrogen ions during battery charging.

The present invention also provides a battery employing an anode which includes a solid material containing a metal whose cation can assume at least two different non-zero oxidation numbers.

In accordance with another embodiment of the invention, there is provided a battery operating under ambient conditions and including an anode, a cathode, and a non-liquid proton-conducting electrolyte between, and in contact with, the anode and cathode, wherein (a) the anode includes at least one material which includes a metal whose cation can assume at least two different non-zero oxidation numbers; (b) the cathode includes a compound which forms an electrochemical battery couple with the above anode; and (c) the electrolyte includes a non-liquid material in which protons are mobile.

It should be noted that throughout this document, for both anodes and cathodes, the phrase "a metal whose cation can assume at least two different non-zero oxidation numbers" refers to the type of metal, i.e., one that can in some chemical environment become a cation which can assume at least two different non-zero oxidation numbers, yet not in all the compounds or materials which include such a metal according to the invention, the metal becomes or is a cation, as for example in some cases the metal is covalently associated with other atoms/molecules.

In an electrochemical rechargeable version of an electrochemical cell according to the present invention, the anode and cathode materials are specifically chosen so that each reacts at least partially reversibly during battery operation.

While electrochemical reactions involving the reversible reactions such as (i) hydroquinone into quinone, protons and electrons and (ii) methylene blue oxidized to yield a proton and an electron are known, these reactions have been carried out using the hydroquinone or methylene blue as dissolved substances in a liquid electrolyte. The application of non-liquid proton-donating organic compounds at ambient temperature (e.g., 15°–30° C.) in electrochemical reactions using a non-liquid (e.g., solid, gel or polymer) electrolyte as the proton-conducting medium, and especially as anodes in solid state rechargeable battery applications, are not known in the prior art.

The present invention solves the deficiencies of the prior art, and thereby distinguishes itself from the prior art, by using a non-liquid electrolyte which has high ambient temperature proton conductivity in conjunction with organic compounds which do not require heat activation for operation as the active anode material successfully in a rechargeable battery which is not activated by heat. The special combination of the organic compounds and non-liquid electrolyte of the present invention combines all of the following advantages: rechargeability, stable chemistry, non-toxic materials, non-corrosive materials, no chlorine odors, materials which are easy to handle and process, operation under ambient conditions, and materials which are insoluble in non-liquid electrolyte, have a high voltage and a high energy and power density. This combination of these desirable features could not have been predicted from the prior art nor was achieved by the prior art.

This invention is also an improvement over the prior art since high cell voltages are achieved with a non-liquid proton conducting electrolyte with non-corrosive, safe, chlorine-odor free, stable, insoluble, and non-toxic organic compounds. A cell exemplified in an embodiment of the present invention has a working voltage above 0.95 volts and can be as high as about 1.7 volts, thus achieving the advantage of voltage levels which are practical for ambient temperature operating commercial batteries with electrodes containing advantageous organic compounds in conjunction with a non-liquid proton conducting electrolyte.

In conventional batteries based on proton reactions, such as nickel/metal hydride cells, hydrogen gas is stored as a hydride in a hydrogen storage alloy or hydrogen storage metal anode and converted to protons in an electrochemical battery discharge reaction. The protons are transferred to the cathode in a liquid electrolyte.

In the nickel/metal hydride technology, the hydrogen gas stored in the metal alloy anode is desorbed and oxidized electrochemically to protons and electrons in the anodic discharge reaction. During charging, the hydrogen produced by water electrolysis is absorbed by the anode material. Disadvantages of such a battery include: flammable hydrogen gas can be released under certain conditions leading to possible explosions, pressure build-ups which require cell venting mechanisms, and other safety risks. The organic compounds of the present invention, on the other hand, react reversibly with protons without the involvement of a gaseous hydrogen phase thus achieving safety advantages and avoiding the disadvantages of the metal hydride technology batteries.

Some other of the disadvantages (see, for instance, A. Visintin, in Electrochem. Soc., vol. 139, 1992, p. 985) of the current metal/hydride batteries are their high self-discharge rate. In addition, since they have within partial pressures of hydrogen gas, they could pose a safety hazard. Also, cell assembly is complicated and made expensive since they may be pressurized and in some situations, high internal pressures are created.

The present invention possesses advantages over the conventional metal/hydride battery. For instance, since there is a non-liquid electrolyte in a cell according to the present invention, it can not leak and no structural inert separators between the electrodes, such as for absorbing liquids, are required. Also, the cell operates at atmospheric pressure so cell design and assembly is less expensive, simpler and safer. Also, since the cell operation does not require hydrogen gas, the cell is inherently safer.

Many of the organic materials which have hydrogen ion redox behavior are known as materials which are dissolved in aqueous or non-aqueous electrolytes in order to be active. In the present invention, a distinguishing feature is that they are used as a hydrogen ion source in the solid state and the hydrogen ions of the redox reaction are transported in a non-liquid proton conductor electrolyte.

The organic hydrogen ion source materials of the present invention are distinct from previously known hydrogen storage compounds such as $PdH_x$ (U.S. Pat. No. 4,894,301) and metal alloy hydrides such as $LaNi_{4.7}Al_{0.3}$ (J. Electrochem. Soc., vol. 134, 1987, p. 558, T. Sakai, et al.), or $MmNi_{3.5}Co_{0.7}Al_{0.8}$ (Mm=mischmetal, composition on atomic percent: La - 25.4, Ce - 53.6, Pr - 5.4, Nd - 15.6, J. Electrochem. Soc., vol. 139, 1992, p. 172, N. Kuriyama, et al.). Similar effective compositions are also known such as $MmNi_{3.6}Co_{0.7}Al_{0.3}$ and alloys containing V, Ni, Ti, Zr and Co in various stoichiometries (U.S. Pat. No. 5,135,589). The prior art electrodes have the disadvantages of using expensive metals such as Pd, or metals dangerous to health like Ni and Co, or rare earth metals. Another disadvantage is the complicated metallurgy and manufacturing expense required to arrive at the proper composition of the metal alloy hydrogen storage electrodes. In addition, the prior art hydride electrodes are used in batteries which use a liquid electrolyte, typically aqueous KOH solutions.

Other advantages of the present invention include safer operation, the elimination of expensive hydrogen storage materials and the elimination of the need for loading the metal hydride under hydrogen pressure as in prior art technology.

BRIEF DESCRIPTION OF THE DRAWINGS

The invention is herein described, by way of example only, with reference to the accompanying drawing, wherein the sole FIGURE schematically depicts in cross-sectional view a battery according to the present invention showing an anode 10, a cathode 12 and an electrolyte 14, as well as a pair of leads 16 and 18 and, optionally, a pair of conducting plates 20 and 22.

DESCRIPTION OF THE PREFERRED EMBODIMENTS

The organic proton-donating anode material employed in accordance with one embodiment of the invention is an aromatic, non-aromatic ring or chain compound. The theoretical capacity of the anodic material will depend on its molecular weight and the number of active hydrogen ion sites. An active hydrogen ion site, for purposes of this invention, is capable of donating a proton during battery discharge. A hydroxy group is one example of such a site. Depending on the end-use applications, the choice of anode and cathode active materials, the type of ionically conductive electrode additives, and the type of electronic conductive electrode additives, can be chosen to best meet the requirements of the particular application of the invention.

In a preferred embodiment both the anode and/or the cathode include a proton conducting material which may be a solid, a gel, a polymer or a solution, such as an aqueous acid solution like sulfuric acid, methane sulfonic acid, nitric acid, hydrofluoric acid, hydrochloric acid, phosphoric acid, $HBF_4$, perchloric acid or pyrophosphoric acid. Alternatively the solution includes a solvent such as a protic solvent or a non-aqueous aprotic solvent and an acidic compound.

The various possible anodic organic compounds include aromatic, non-aromatic ring, and chain molecules, with attached hydrogen ion sites which may, in addition, feature additional functional groups. Furthermore, one or more carbons in the molecule may be substituted with other constituents, such as sulfur, nitrogen or oxygen.

Certain of the aromatic compounds are related to a benzene ring structure. For example, mono-hydroxy derivatives such as hydroquinone monomethyl ether, hydroxy acetophenone, hydroxybenzaldehyde, hydroxy benzoic acid, hydroxybenzonitrile, acetaminophen, hydroxybenzyl alcohol, hydroxycinnamic acid and methylparabin; di-hydroxy derivatives, such as 2,5-dihydroxy-1,4-benzoquinone, resorcinol, ascorbic acid and its derivatives, 1,4-dihydroxy benzene (hydroquinone), 3-hydroxy tyramine (dopamine), rhodizonic acid, and co-enzyme $Q_n$, where n, the length of the isoprenoid chain attached to the benzoid ring, is in the range of from 1 to 10; tri-hydroxy derivatives such as 1,2,3-trihydroxy benzene (pyrogallol) and 1,3,5-trihydroxy benzene (phloroglucinol); tetra-hydroxy benzene derivatives such as tetrahydroxy quinone (THQ, also known as tetroquinone or tetrahydroxy-p-quinone) in its non-hydrated, dihydrate and hydrated forms, with the dihydrate being preferred, tetrahydroxy acetophenone and tetrahydroxy benzoic acid; hexa-hydroxy benzene derivatives such as hexahydroxy benzene.

Other compounds include tetrahydroxy quinone, hexahydroxybenzene, chloranilic acid, a reduced form of chloranilic acid, chloranil, rhodizonic acid, fluoroanilic acid, a reduced form of fluoroanilic acid, fluoranil and duroquinone.

Other of the aromatic compounds are condensed or fused polycyclic aromatics in which adjacent rings share two carbons. For example, bi-cyclic naphthalene derivatives such as mono-hydroxy derivatives like naphthols, 1-nitroso-2-napthol, martius yellow, and hydroxy-1,4-naphthaquinone, di-hydroxy derivatives such as naphthalene diols, tetra-hydroxy derivatives such as tetrahydroxy napthalene and tetrahydroxy 1,4-naphthaquinone, and pentahydroxy naphthaquinones such as echinochrome and pentahydroxy 1,4-naphthaquinone. Other examples are tri-cyclic anthracene derivatives such as mono-hydroxy derivatives like anthranol and hydroxy anthraquinone, di-hydroxy derivatives like anthralin, anthrarufin, alizarin and di-hydroxyanthraquinone, tri-hydroxy derivatives like anthrobin, anthragallol, purpurin and 1,8,9-anthracenetriol, and tetra-hydroxy derivatives like 1,2,5,8-tetrahydroxyanthraquinone and carminic acid. Still other examples are bi-cyclic derivatives such as purpogallin.

Further aromatic compounds are biaryls, benzoid compounds in which benzene rings or condensed systems are attached by a bond, such as hydroxybenzophenone, hydroquinone monobenzylether, hydroxy biphenyl, 2,2,4,4,-tetrahydroxy benzophenone, phenolphthalein, indophenol, bromophenol blue, methylenedigallic acid and methylenedisalicyclic acid, or compounds having an oxygen substituting for a carbon in an aromatic ring like 5-hydroxy-2(5H)-furanone, hydroxycourmarin and fustin, or a nitrogen substituted aromatic ring like the multi-cyclic hydroxindole, tetrahydro papaveroline, oxindole, o-phenanthroline in its hydrated and unhydrated forms, phenanthridine, 6(5H)-phenanthridinone, and hydroxyjulolidine and the single-ringed N-hydroxymaleimide, citrazinic acid, uracil, 2-amino-5-bromopyridine, 5-aminotetrazole monohydrate, 2-aminothiazole, 2-aminopyrimidine, 2-amino-3-hydroxy-pyridine, 2,4,6-triaminopyrimidine, 2,4-diamino-6-hydroxy pyrimidine, 5,6-diamino-1,3-dimethyluracil hydrate, 5,6-diamino-2-thiouracil, cyanuric acid, cyanuric acid compound with melamine, and hydroxy methyl pyridine.

Certain of the compounds are based on a 4-membered aromatic ring. For example, squaric acid. Certain of the compounds are based on a 5-membered aromatic ring such as croconic acid, reductic acid, 5-methyl reductic acid, and other reductic acid derivatives. Other compounds include calix(4)arene.

Methylene blue is a known redox material which reacts reversibly with protons in electrochemical redox reactions. The successful use of methylene blue as an anode material (see Example 7 below) teaches that the reversible redox of protons in a non-liquid battery according to the present invention is not limited to hydroxy-substituted aromatic compounds such as those listed above but is a broader behavior of several types of aromatic proton-donating materials such as, but not limited to, the amino substituted compounds listed above as well as 1,2-diaminoanthraquinone and 3-amino-2-cyclohexen-1-one.

It is to be understood that the aforementioned listing of solid organic compounds for the solid state anode is only representative of the class of hydrogen ion sources which are contemplated for use as the active organic material in the anode of the present invention. Any solid organic substances capable of acting as a source of protons in an electrochemical reaction at the anode of a battery power source for conversion of chemical energy to electrical energy may be used as the active component for the anode in such a battery.

The aromatic ring compounds of this invention have similar analogues which are non-aromatic ring compounds. In an alternative embodiment of this invention, non-aromatic proton-donating ring compounds can be used in the anodes as the active material. The non-aromatic proton-donating ring compounds are similar to the aromatic ring compounds except that they do not have aromaticity. Suitable non-aromatic proton-donating compounds include, but are not limited to, 6-membered ring compounds such as pentahydroxy cyclohexanonthiosemicarbazon, pentahydroxy cyclohexanon diethyl thioacetal, and 2,3,5,6 tetrahydroxy cyclohexane-1,4 dione, tri-keto-tri-hydroxy cyclohexane, inositol, scyllo-Inosose, uramil, urazole, chloranilic acid, fluoranilic acid, reduced forms of chloranilic and fluoranilic acids, and quinic acid, as well as octahydroxy cyclobutane.

Similarly, the proton-donating ring compounds of this invention have similar analogues which are non-ring compounds having the same proton-donating groups. In an alternative embodiment of this invention, solid state proton-donating chain compounds can be used in the anodes as the active material. The proton-donating chain compounds are similar to the aromatic and non-aromatic ring compounds in the respect that they contain the same proton-donating groups like hydroxy groups. Non-limitative examples of such chain proton-donating compounds include mucic acid and meso-erythritol.

In yet another embodiment of the invention the anode includes a quinone compound as the active material.

In yet another alternative embodiment of this invention the anode includes a material containing a metal whose cation can assume at least two different non-zero oxidation numbers. Preferably the standard reduction potential of the electrochemical redox reaction involving the different oxidation states of the metal of the material is such that, when the anode containing this material is coupled with a cathode of this invention, the resulting battery has a useful voltage level. In a preferred embodiment of this invention the anodic active material contains a metal M where M is selected from the group consisting of Sn, Ti, Cu, Al, W, Sb, Ir, Mo, Bi and Cr, and of these, W, Sb, Bi and Sn are the most preferred. These materials may be in their hydrated or non hydrated forms. These materials may also be in a polymer form. Examples include but are not limited to $SnO_2$, SnO, $SnSO_4$, $Bi_2O_3$, $Sb_2O_3$, $WO_3$, tin hydroxides, antimony hydroxides and $H_3WO_4$. It should be noted that throughout this document the terms 'oxidation state' and 'oxidation number' are equivalent and are interchangeably used. The concept of oxidation number is introduced to refer to the charge the metal would have if it was ionized.

In one embodiment of this invention, the initial oxidation number of the metal is one of the lower oxidation numbers of the possible non-zero oxidation numbers for that metal cation. In this situation, the battery made from an anode containing a material with a metal in one of its lower oxidation states, coupled with an appropriate cathode of this invention, may be directly discharged after construction. In another embodiment, the initial oxidation number of the metal is in one of its higher oxidation numbers of the possible non-zero oxidation numbers for that metal cation. In this situation, the battery made from an anode containing such a material with a metal in one of its higher oxidation states, coupled with an appropriate cathode of this invention, may be charged after construction in order to gain maximum useful energy from the battery.

Some of the active compounds to be used in the anode of this invention are known to occur in various hydrate forms. The non-hydrated and all of the hydrated forms, where relevant, of all of these compounds are considered to be within the scope of this invention and are useful in the anodes of the present invention.

In a preferred embodiment of the invention the material contained in the anode of this type is selected from the group consisting of a cation exchange material and a cation adsorber material treated with a solution containing a substance selected from the group consisting of Sn, Cu, Ti, Cr, Al, W, Sb, Ir, Mo, and Bi salts and non-salt compounds.

In another preferred embodiment of the invention the anode of this type further includes a catalyst for catalyzing battery anodic reactions.

In still another preferred embodiment of the invention the anode of this type further includes a material selected from the group consisting of a cation exchange material and a cation adsorber material.

In yet another preferred embodiment of the invention the anode of this type further includes chloranilic acid, tetrahydroxy quinone, phenol, catechol, hydroquinone, 3,4,5-trichloro salicylanilide, tetrachloro salicylanilide, etc.

In yet another preferred embodiment of the invention the active material contained in the anode is a polymer.

The cathode may be made from one or more of a number of materials including, but not limited to, $WO_3$, transition metal dioxides $MO_2$ (where M=Mn, Mo, Ir, Cr, Ti, Nb, V, or W), $V_2O_3$ and related vanadium oxides, NiOOH, $Ni(OH)_2$, polycarbon fluoride, polydicarbon fluoride and naphthalene. Manganese dioxide useful in the cathode of this invention may include various grades of electrolytic or chemical manganese dioxide, with the untreated electrolytic form being preferred, or may include heat treated electrolytic and chemical manganese dioxide which is heated at about 375° C. for several hours in air and is then oven cooled.

Another form of manganese dioxide useful in this invention is the lambda form of manganese dioxide. In a non-limitative example, the lambda form of manganese dioxide is prepared from the nominal composition spinel $LiMn_2O_4$ by treating the spinel with aqueous acid. This apparently converts it to the lambda form of manganese dioxide by extracting essentially all of the lithium, while maintaining the structure of the original spinel.

Further cathode active compounds include mono- and divalent silver oxide, tantalum oxide, and molybdenum trioxide. Additional compounds include transition metal dichalcogenides, such as metal sulfides $MS_2$ (where M=Mo, Ti, Ta, V, Zr, Hf) and metal selenides $MSe_2$ (where M=Zr, Hf, Nb, V, Ta, Ti, Mo, W) and niobium triselenide. Still further compounds include layered perovskites and layered compounds which contain perovskite sub-structures such as but not limited to $Bi_2Sr_2CaCu_2O_{8+y}$, $Bi_2Sr_2Cu_1O_{6+y}$ and $YBa_2Cu_3O_7$. Yet further compounds include fullerenes like the 65 carbon fullerite and a manganese compound.

In a preferred embodiment, the manganese compound is selected from the group consisting of manganese sulfate in its hydrated forms, manganese sulfate in its non-hydrated form, manganese dioxide in its chemical form, manganese dioxide in its electrolytic form, manganese dioxide in its natural form, lambda manganese dioxide and a manganese compound which is made by treating a spinel lithium manganese oxide of a nominal formula $LiMn_2O_4$ to remove the lithium.

Other cathodic active compounds include triquinoyl (also known as hexaketocyclohexane and cyclohexane-hexone) in its non-hydrated, hydrated, dihydrate and octahydrate forms, and leuconic acid in its non-hydrated, hydrated and pentahydrated forms.

Further compounds include pseudothiohydantoin, 3-sulfolene, uric acid, hydantoin, barbituric acid, glycine anhydride, 2,4-thiazolidinedione, thioxanthen-9-one, 5-nitro-uracil, glutarimide, parabanic acid, 1,5-dihydropyrimidol-[5,4-d]-pyrimidine-2,4,6,8(3H, 7H)-tetrone, thiotetronic acid, 2,4,6 triaminopyrimidine, o-phenanthroline monohydrate, dehyro ascorbic acid dimer, 1,3 dichloro-5,5 dimethyl hydantoin, anthraquinone, quinone, anthracene, dichloromaleic anhydride, 3,5,dinitro benzoic acid, tetrachlorophthalic anhydride, chloranil, fluoranil, 2-ethyl anthraquinone and other alkyl anthraquinones, duroquinone, succinimide, 2,3-dichloro 5,6-dicyano 1,4-benzoquinone, 4(6)-amino uracil and hydrindantin.

Yet further compounds include salts of the rhodizonic acid and tetrahydroxy quinone compounds including the di-potassium salts and di-sodium salts of rhodizonic acid and tetrahydroxyquinone.

Yet further compounds include tri-chloro cyanuric acid, cyanuric chloride, cyanuric acid anhydrous, di-chloro isocyanuric acid, di-chloro isocyanuric acid lithium, potassium or sodium salt, trichloro isocyanuric acid, trichloromelamine, hexachloromelamine, N-chlorosuccinimide, succinimide, succinic anhydride, m-dinitrobenzene, 2,4-dinitrophenol, picric acid, 4-nitrosophenol, p-quinonedixime, dichlorobenzoquininediimine, N,N-dichloro-dimethyl-hydantoin and other N-halogen organic compounds and other aromatic nitro compounds.

Yet further compounds include substituted biureas such as referred to in U.S. Pat. No. 3,481,792 which is incorporated by reference as if fully set forth herein. Yet further compounds are substituted azodicarbonamides such as referred to in U.S. Pat. No. 3,357,865 which is incorporated by reference as if fully set forth herein.

In an alternative embodiment of this invention, the cathode includes a compound containing a metal whose cation can assume at least two different non-zero oxidation numbers. Preferably the standard reduction potential of the electrochemical redox reaction involving two different oxidation states of the metal cation of the compound is such that, when the cathode containing this compound is coupled with an anode of this invention, the resulting battery has a useful voltage level.

In a preferred embodiment of this invention, the cathodic active compound is a salt or a non salt compound which contains a metal M, where M is selected from the group consisting of Mn, Ce, Fe, or Co and, of these, Mn is the most preferred. In one embodiment, the initial oxidation number of the metal is a lower oxidation number of the possible non-zero oxidation numbers for that metal cation. In this situation, the battery made from such a cathode containing a compound with a metal in one of its lower oxidation states, coupled with an anode of this invention, may be first charged after construction before discharge in order to gain maximum useful energy from the battery. In another embodiment, the initial oxidation number of the metal is one of the higher oxidation numbers of the possible non-zero oxidation numbers for that metal cation. In this situation, the battery made from such a cathode containing a compound with a metal in one of its higher oxidation states, coupled with an anode of this invention, may be discharged after construction in order to gain maximum useful energy from the battery.

In one embodiment of the invention the cathodic active material may include one or more of a number of compounds including but not limited to: M acetate, M bromide, M carbonate, M chloride, M citrate, M fluoride, M iodide, M molybdate, M nitrate, M oxalate, M orthophosphate, M selenate, M sulphate, and M tungstate. In these compounds, M can be as follows: M=Ce(III), and in the case of fluoride and sulphate also Ce(IV); M=Co(II), and in the case of acetate, chloride, fluoride and sulphate also Co(III); M=Mn (II), and in the case of acetate, chloride, fluoride and sulphate also Mn(II). III and II represent the oxidation number of the metal M cation. Other compounds include:

M lactate where M=Mn (II)

M metaphosphate where M=Ce(III)

M tantalate where M=Mn(II)

M titanate where M=Mn(II)

Yet further compounds include the following Mn(II) compounds: Mn di-hydrogen orthophosphate, Mn monohydrogen orthophosphate, Mn pyrophosphate, Mn hypophosphite, Mn orthophosphite. Yet further compounds include the following Mn(III) compounds: Mn orthophosphate and Mn metaphosphate. Yet a further compound is $Mn_2O_3$.

Various compounds listed above for the cathode active material are known to occur in various hydrate forms. All of the hydrated forms of these compounds are considered to be within the scope of this invention. As a non-limitative example, Mn sulphate has the following hydrated forms: $MnSO_4$-x $H_2O$ where x is an integer in the range of from 0 to 7, all of which are suitable cathode materials according to the invention. Most preferably, the cathode includes $MnSO_4$-x $H_2O$ where x is zero or one.

In the prior art, compounds such as $MnPO_4$ have been used in battery cathodes but only with aqueous liquid electrolytes. Cathodes such as $MnPO_4$ are not suitable for long life liquid electrolyte batteries. For instance, $MnPO_4$ is not stable in such aqueous electrolytes and decomposes. Many metal salts are soluble in a liquid electrolyte and so the stability of electrodes incorporating these soluble salts in liquid electrolyte batteries is significantly diminished. In the present invention, the combination of the active electrode compounds listed above with a non-liquid electrolyte eliminates these problems, since these compounds are not soluble in the non-liquid electrolyte according to the invention.

In an alternative version of the oxidation number embodiment of this invention for anodes and cathodes, a cation or anion exchange material or ion adsorber material in the form of a sheet or resin, is mixed with the materials of the cathode or anode mix or alternatively is positioned between the anode and the cathode. The ion exchanger or adsorber is a natural or synthetic substance. Ions attached to the exchanger or adsorber can be exchanged for equivalent amounts of other ions of the same charge. The adsorber resins are polar in character and adsorb ions. Common cation exchange materials are styrene or acrylic-based materials that are of the gel or macroreticular type. They can be produced, for example, by sulfonating cross-linked polystyrene. It is common to cross-link them with divinylbenzene.

In a preferred embodiment of this invention, strong cation exchangers of the $H^+$ form are used.

In an alternative embodiment, the cation exchanger or adsorber material is treated with an aqueous solution of an appropriate metal salt or non-salt compound.

In the case of using these solution treated cation exchange materials in cathodes, an aqueous solution of Mn, Fe, Ce and Co salts or other non-salt compounds, can be used, with Mn being preferred. In a preferred embodiment, an aqueous solution of Mn sulphate is poured through a bed of a strongly acidic $H^+$ form cation exchanger. The divalent Mn cation replaces protons in the cation exchanger. The ion exchanger can be rinsed with water afterwards and dried. The cation exchanger treated with the aqueous Mn sulphate solution is used in cathodes.

In an analogous fashion, in the case of using the cation exchange materials in anodes, an aqueous solution of Sn, Ti, Cu, W, Sb, Ir, Mo, Bi or Cr salts or other non-salt compounds can be used, with W, Sb, Bi and Sn being preferred. The treated ion exchanger is used in the anode.

To one skilled in the art it will be obvious that any appropriate solvent-solute solution containing metal salts or other non-salt compounds, can be used to treat the cation exchanger and that various methods are available to exchange cations into the cation exchanger. In addition, various types of cation exchangers can be used, of various forms, shapes, and sizes and chemical composition and degree and type of cross-linking.

In an alternative version of the oxidation number embodiment for anodes and cathodes, a chelating agent may be added to the electrode mix containing the compound. Metal cations will commonly form a complex with many chelating agents. In a preferred embodiment, a complex agent is added to the cathode mix in order to complex the manganese cation. Non-limitative examples of chelating agents include malonic acid, oxalic acid, ethylene diamine tetraacetic acid (EDTA), and benzoyltrifluoroacetone.

Active compounds to be used in the cathode of this invention are known to occur in various hydrate forms. The non-hydrated and all of the hydrated forms of these compounds, where relevant, are considered to be within the scope of this invention.

For one skilled in the art, it will be obvious that the compounds of this invention used in the anode which have both proton-donating and proton-accepting groups (for instance, but not limited to, tetrahydroxyquinone, reductic acid, chloranilic acid and rhodizonic acid), can also be used in the cathode when coupled with an appropriate anodic material. This is because the proton-accepting groups of such a compound present in the cathode are available to accept protons during cell discharge.

Similarly, it will be obvious that the compounds of this invention used in the cathode which have both proton-donating and proton-accepting groups can also be used in the anode when coupled with an appropriate cathodic material. This is because the proton-donating groups of such a compound present in the anode are available to donate protons during cell discharge.

It is also a teaching of this invention that compounds of this invention used in the anode that have proton-donating groups which are capable of donating protons in an anodic discharge reaction can be converted to their discharged state (that is deprotonated) and used in the cathode when coupled with an appropriate anodic material. This is because the deprotonated groups become proton-accepting groups and when such compounds are used in the cathode these proton-accepting groups are available to accept protons during cell discharge. For instance, hydroquinone can be used in the form of quinone (protons are no longer present on the former hydroxy groups attached to the ring) in the cathode of this invention when coupled with an appropriate anodic active material of this invention. Similarly, as another non-limitative example, hexahydroxy benzene can be used in the form of triquinoyl in the cathode when coupled with an appropriate anodic active material of this invention.

It is also a teaching of this invention that the compounds used in the anodes of this invention can also be used in the cathode of this invention when coupled with an appropriate anode of this invention, if the resulting battery cell is first charged after construction before it is discharged.

It is also to be understood from this invention that the compounds of this invention that contain both proton donating and proton accepting groups (such as but not limited to tetrahydroxyquinone, reductic acid, chloranilic acid and rhodizonic acid) can be coupled with the appropriate cathodic active material and used in the anode in battery cells which may be either first discharged after construction, or coupled with the appropriate cathodic active material and may be first charged after construction before being discharged. In the situation where the cell is first charged, the proton accepting groups of such compounds accept protons during charging. The product of the charging reaction participates in the discharge reaction. As a non-limitative example, tetrahydroxyquinone in an anode, coupled with the appropriate cathodic active material of this invention, is reacted to hexahydroxybenzene in a two electron charging reaction. For an initial charge which goes to completion it is the hexahydroxybenzene product in the anode which is subsequently discharged. In another non-limitative example, rhodizonic acid in the anode, when coupled in a cell of this invention with the appropriate cathodic active material, is reacted to the tetrahydroxyquinone charge product in a two electron charging reaction and to the hexahydroxybenzene charge product in a four electron reaction.

It is also to be understood from this invention that proton accepting compounds used in the cathode in cells which are first discharged can alternatively be used in their discharged (that is protonated) state as the cathode active material, when coupled with appropriate anodes, in cells which are first charged after construction before discharge. As a non-limitative example, $Ni(OH)_2$, the protonated form of $NiOOH$, is used in the cathode and coupled with an appropriate anode of this invention. The resulting cell may be first charged after construction before being discharged to gain maximum useful energy.

It is also to be understood from this invention that proton donating compounds used in the anode in cells which are first discharged can alternatively be used in their discharged (that is de-protonated) state as the anode active material, when coupled with appropriate cathodes, in cells which are first charged after construction before being discharged, in order to gain maximum useful energy.

It is also a teaching of this invention that the compounds used in the anodes that contain both proton donating and proton accepting groups (such as but not limited to tetrahydroxyquinone, reductic acid and rhodizonic acid) can be used as an internal electrochemical over-charge buffer in a battery. Using tetrahydroxy quinone as a non-limitative example, in the case of over-charge, after the four initial hydroxy groups which were discharged have subsequently participated in the charge reaction to accept protons, the two quinone groups are available to react with additional protons that are transported to the anode during over-charge. Thus, these two quinone groups act as an internal proton reservoir for over-charge protection which prevents damaging side reactions.

In an alternative embodiment the compound contained in the cathode is a polymer.

In another preferred embodiment, the cathode further includes a catalyst for catalyzing battery cathodic reactions. Preferably the catalyst is potassium peroxymonosulfate, potassium persolphate, bismuth oxide, biguanide, biguanide sulphate, praseodymium oxide, thiourea, etc.

It is a property of the non-liquid protonic conductor electrolyte used in the present invention to pass hydrogen ions and to have high protonic conductivity especially at room temperature. The electrolyte should also be at least partially stable towards the components of the anode, cathode and current collector.

It is known tom the prior art that rechargeable batteries have been developed which contain a solid proton-conducting electrolyte rather than a liquid electrolyte. Such solid state batteries exhibit practical advantages such as avoidance of fluid leakage or drying out, no need for a separator between the electrodes, and lend themselves to be constructed into various shapes and flexible designs with simpler manufacturing technologies possible as compared to liquid electrolyte cells. Furthermore, solid state electrolyte batteries are generally considered to have good shelf life and storage stability.

Non-liquid electrolytes of the present invention contain a solid material in which protons are mobile, such as, but not limited to, a heteropolyacid in its hydrated form, a heteropolyacid in its non-hydrated form, a polymerheteropolyacid blend, a single phase substance made of a heteropolyacid and a polymer and a multi-component substance which includes a heteropolyacid and a polymer.

Presently, a preferred polymer is polyvinyl alcohol in its fully or partially hydrolyzed forms. Preferably the polyvinyl alcohol polymer has a molecular weight ranging between substantially 15,000 and substantially 186,000.

Example of heteropoly acids includes molybdophosphoric acid (MPA), tungstophosphoric acid (TPA) molybdosilicic acid (MSA) and tungstosilicic acid (TSA) or salts thereof or their respective hydrates at various states of hydration or mixtures of these. Other examples of suitable heteropoly acids are referred to in U.S. Pat. Nos. 4,024,036 and 4,594,297, which are incorporated by reference as if fully set forth herein. Some properties of MPA and TPA are described in Chemistry Letters, pp. 17–18, 1979, O. Nakamura, et al.

It is to be understood that the aforementioned listing of non-liquid protonic conductors are only representative of the class of non-liquid materials in which protons are mobile which are contemplated to be employed in the non-liquid electrolyte of the present invention. In addition, incorporating the non-liquid electrolyte in the battery can be in a raw form, it can be processed into a gel form by using various gelling agents such as but not limited to silica gels (see, Solid State Ionics 59 (1993) p. 171, M. Tatasumisago, et al.), used in solid blend with for example a polymer, as in U.S. Pat. No. 4,594,297, or processed according to the methods given in the Examples below.

It is known from the prior art that a number of solid state proton conductors exist and some have been used in battery applications. MPA and TPA are among the highest conductivity solid state protonic conductors at room temperature. It is important to note that the prior art teachings of heteropoly acids refers only to their use in fuel cells. Prior art for their application in battery power sources is not known. The solid electrolytes of this present battery invention which include a heteropoly acid are further distinguished from the prior art use of heteropoly acid solid electrolytes in fuel cells since in the present invention there is no need for a humidity control device as described for example in U.S. Pat. No. 4,380,575.

According to another embodiment of the invention, the non-liquid electrolyte includes an anion exchanger which does not block protons, an anion adsorber which does not block protons or a cation adsorber.

According to another embodiment of the invention, the non-liquid electrolyte includes cation exchange materials. These cation exchange materials include their hydrogen ion forms. The cation exchangers include those based on chlorosulfonated polyethylene, sulfonated polystyrenes, sulfonated polysulfones and copolymers of these materials, such as those based on divinylbenzene and sulfonated styrenes. These materials may have various degrees of cross-linking and exchange capacities. Other materials include Nafion (a trademark of DuPont for perfluoro-sulfonic acid cation exchanger), such as Nafion 112, 115 and 117, Flemion (a trademark of Asahi Glass Co. of Japan, which is similar to Nafion), cellulose acetate and cellulose triacetate membranes. The non-liquid electrolyte can be incorporated in the battery between the electrodes as a film, assemblage of beads or membrane. In addition, the non-liquid electrolytes containing the cation exchange or adsorber materials can be used in dry or wetted form. The cation exchanger may also be contained within the anode or cathode, such as in the form of beads or by applying them as a solution. Nafion, for example, is available as a solution. Alternatively, the ion exchange material can be an anion exchanger which does not block proton transport. Other ion exchange materials include the Selemion membranes of Asahi Glass Co. Ltd. of Japan.

Thus, according to the invention, the non-liquid material in which protons are mobile includes an ion exchange material or an ion adsorber material.

According to another embodiment of the invention, the non-liquid electrolyte further includes an electronically insulating metal oxide compound. Preferably the metal of these metal oxide compounds is Al, Si, Ce, Ti, Mg or Fe. Examples of electronically insulating metal oxide compounds include but are not limited to $SiO_2$, $Fe_2O_3$, $TiO_2$ and $Al_2O_3$.

In a preferred embodiment of the invention, the anode and the cathode contain their respective active electrode material and each further contains a non-metallic electrically conductive material, for example graphite, carbon black, activated carbon or other carbon materials and a non-liquid proton-conducting material such as a heteropoly acid, for example MPA or TPA.

According to an alternative embodiment of the invention, the proton-conducting material contained in the anode and cathode can be a concentrated acid or aqueous solution of such an acid, for example, sic acid, methane sulfonic acid, nitric acid, hydrofluoric acid, hydrochloric acid, phosphoric acid, $HBF_4$, perchloric acid and pyrophosphoric acid. In a preferred embodiment, concentrated (e.g., 1–4M) sulphuric acid solution, in an amount in the range of from 5 to 35 weight per cent of the electrode mix, is added to the cell electrode mix, which consists of the active compound and a high surface area electrically conductive carbon. The treated electrode powder mix containing the acid solution, active compound, and carbon has a free-flowing, dry appearance. While not wanting to be restricted to a certain conclusion, it is the interpretation of the data by the inventor that the dry appearance and free-flowingness of the electrode powder mix is a result of the acid being absorbed by the high surface area carbon electrically conductive material. In yet an alternative embodiment of this invention the proton conducting material contained in the anode and cathode can be a liquid, a gel, a solid or a polymer which conducts protons.

According to yet an alternative embodiment of the invention, the cathode includes manganese sulfate and the anode includes chloranilic acid and carbon.

According to yet an alternative embodiment of the invention, the compound contained in said cathode is selected from the group consisting of a non-hydrated form and hydrated forms of manganese sulfate, and wherein the compound contained in the anode is selected from the group consisting of a non-hydrated form and hydrated forms of chloranilic acid.

The non-liquid rechargeable batteries of the invention can easily be fabricated at ambient temperatures without any special precautions with regard to humidity or oxygen-free atmospheres. They can be made, for example, by pressing powders, sequential deposition, contacting films to electrodes, casting of layers, or printing in layers from aqueous solutions containing the electrode materials as by silk screening or computer designed printing, or painting onto the non-liquid electrolyte or onto a current collector, or any combination of such techniques. The battery may be made in any desired size and shape and several cells may be fabricated in series, in which case adjacent cells can be separated by a bipolar current collector element, such as graphite, carbon black, or non-reactive metal. An important feature of the batteries according to the present invention, which feature distinguishes the batteries according to the invention from prior art batteries such as those disclosed in for example U.S. Pat. No. 4,847,174 is that the inventive batteries require no external application of heat for activation and are therefore operateable under ambient temperature (i.e., room temperature).

When, after use, the battery has become discharged, recharging of the battery can be effected at ambient temperature by applying an appropriate voltage or current across the cell.

The following non-limitative Examples illustrate the invention.

EXAMPLE 1

An anode mix was prepared by first mixing and grinding together at room temperature 0.5 g of graphite powder and 2.0 g of hydroquinone until a homogeneous mixture was obtained (A-1). To 0.105 g of A-1 were then added 150 mg of molybdophosphoric acid (MPA) powder to give a mixture (A-1-M) consisting by weight of 33% hydroquinone, 59% MPA and 8% graphite.

A cathode mix was prepared by first mixing and grinding together at room temperature 277 mg of graphite and 2.464 g of $MnO_2$ until a homogeneous mixture was obtained (C-1). To 0.106 g of C-1 were then added 148 mg of 38% $MnO_2$, 58% MPA and 4% graphite.

A battery cell was constructed by pressing in a cylindrical pellet die of 13 mm diameter made from an electrically insulating sleeve of polymethylmethacrylate plastics material and 316 stainless steel pellets. The insulating sleeve was necessary to prevent shorting out during pressing.

A first stainless steel pellet was loaded into the sleeve and a first 0.2 mm thick graphite sheet was then placed into the die to avoid contact between the MPA and the steel pellet and to provide a good surface for electrical contact to the external circuit. 0.124 g of A-1-M powder was then placed in the die on top of the graphite sheet. A second steel pellet was placed on top of the anode mix, which was then lightly pressed by hand. The second steel pellet was then removed and 0.277 g of MPA was added to completely cover the lightly pressed anode mix. The MPA was lightly pressed on to the anode mix using the steel pellet which was again removed and 0.124 g of cathode mix C-1-M was added to completely cover the lightly pressed MPA electrolyte layer. A second graphite sheet identical to the first sheet was then placed in the die on top of the C-1-M mix and the second steel pellet was placed on top of the graphite sheet and the entire cell heavily pressed in a vice. The resulting composite pellet consisted of five distinct layers: graphite sheet, A-1-M, MPA, C-1-M, and graphite sheet. This composite pellet was easily and cleanly removed from the press die as a single unit and was ready for use.

The battery cell made in the foregoing manner had an open circuit potential of +0.584 volts (close to the theoretical voltage for the hydroquinone/quinone: $MnO_2$ couple in acid electrolyte of +0.551 volts). This is a good indication that the following reactions occur in the cell:

anode: $H_2Q \longleftrightarrow Q + 2H + 2e^-$ cathode: $MnO_2 + H^+ + e^- \longleftrightarrow MnOOH$ where $H_2Q$ represents hydroquinone and Q represents quinone. The battery cell was then discharged for 17 hours on a resistive load of 8 kiloohms. The working voltage remained above +0.4 volts during this time. The cell was then charged by 1.550 volts dropped across a 100 kiloohm resistor for 8 hours. At the end of charging the voltage was about +0.726 volts. The cell was then discharged in the same resistive load for 15 hours and then recharged for six days to a voltage of 1.018 volts, following which it was again discharged for a third time on the same resistive load.

EXAMPLE 2

A three cell bipolar battery was constructed using the same procedure as in Example 1. The anode mix (A-2-M) consisted of 350 mg A-1 mixed with 150 mg of MPA. Thus, the A-2-M mix contained by weight 56% HQ, 14% graphite and 30% MPA.

The cathode mix (C-2-M) consisted of 350 mg of C-1 mixed with 150 mg of MPA. Thus the C-2-N mix consisted by weight of 63% $MnO_2$, 7% graphite and 30% MPA. The order of the construction was the same as in Example 1. After the graphite sheet had been placed on top of the C-2-M mix, the order was repeated twice more in order to build a three cell battery in the plastic die. The graphite sheets between the cells acted as a bipolar current collector.

The open circuit voltage of the battery was +1.66 volts, or +0.553 volts per cell. This battery was discharged and charged as in Example 1.

EXAMPLE 3

This example illustrates how anodes can be prepared as inks and then painted onto the solid electrolyte. Poly-vinyl alcohol was dissolve in an aqueous solution, carbon powder was added, and the mixture was blended by high speed stirring. Then chloranilic acid was added to this mixture and blended in by further high speed stirring.

The ink thus prepared was painted onto the solid electrolyte and allowed to air dry. The cathode ink from Example 4 below was painted onto the other side of the solid electrolyte and allowed to dry.

The resulting cell cycled a number of times showing representative battery action. For one ordinarily skilled in the art it is clear that one can also paint the electrodes onto the cell current collectors and then sandwich the solid electrolyte between them in order to form a battery cell.

EXAMPLE 4

This example illustrates how cathodes can be prepared as inks and then painted onto the solid electrolyte. Poly-vinyl alcohol was dissolve in an aqueous solution, carbon powder was added to the solution and the mixture was blended by high speed stirring. Then manganese sulphate was added to this mixture and blended in by further high speed stirring. For use of this ink for construction of a battery please refer to Example 3 above.

EXAMPLE 5

Using the procedure described in Example 1, two cells were constructed using a cathode mix consisting by weight of 36% $WO_3$, 6% graphite and 58% solid MPA. The remainder of the cell was as in Example 1. The open circuit voltages of the two cells were 0.098 and 0.120 volts, respectively. The cells showed only slight polarization on a 150 ohm load indicating that the system had good rate capability. This Example particularly shows that the hydroquinone anode mix is a high rate electrode and that the MPA is capable of supporting large currents. The reaction at the cathode in this Example was:

$WO_3 + xH^+ + xe^- \longleftrightarrow H_xWO_3$

EXAMPLE 6

The procedure of Example 1 was repeated substituting carbon black for the graphite in the cathode mix. This provided a cell with a flatter discharge voltage profile than in comparable cells using graphite as the conductive additive in the cathode mix. The same weight per cent in the composition of $MnO_2$ and MPA electrolyte was used as in Example 1 giving: 38% MnO$_2$, 4% carbon black and 58% MPA. The remainder of the cell had an open circuit voltage of 0.533 volts. During discharge on the same drain as in Example 1, the voltage curve profile was flatter than cells containing graphite in the cathode mix. A flatter profile has the desirable properties of lower cell polarization, greater energy density and higher average voltage. When discharge had been terminated, the cell was recharged using the same conditions as in Example 1.

EXAMPLE 7

A cell was produced substituting the hydroquinone in the anode mix of Example 1 by methylene blue (MB). The composition of the anode mix in weight per cent was: 28% MB, 14% graphite and 58% MPA. The remainder of the cell was as described in Example 1. The open circuit voltage of the cell was 0.483 volts. The cell was discharged and charged using the conditions of Example 1.

EXAMPLE 8

A 24 square cm area cell was built using a solid TPA/PVA membrane (80 microns thick) as the proton conducting electrolyte. The cathode, one mm thick included of a mixture of manganese sulphate mono-hydrate as the active material, Shawinigan black carbon as the electronically conductive additive (the manganese sulphate monohydrate to carbon weight ratio was 3 to 1), and 4M sulphuric acid as the proton conducting additive. The anode, 1 mm thick included chloranilic acid as the active anodic material, one weight per cent of tin oxide as a catalyst, Shawinigan black carbon as the electronically conductive additive (the chloranilic acid to carbon weight ratio was 3 to 1), and 4M sulphuric acid as the proton conducting additive. Such cells were stacked into a bipolar battery of up to seven cells. The bipolar current collector was a carbon coated stainless steel foil. The batteries were charged at 100 mA current and discharged at 500 mA current. Nominal capacities were about 140 mAH to 0.8 volt cut-off/cell, nominal operating voltage was about 1 volt/cell. The battery was cycled for more than 50–60 cycles at room temperature. The 7 cell stack battery operated a cellular phone for more than 11 minutes (at which point the phone was turned off), provided more than three hours of stand-by time (at which point the phone was turned off), and provided at least 10–15 minutes of talk time (at which point the phone was turned off) after 48 hours of rest in a charged state after the first cycle.

EXAMPLE 9

In this Example the cell composition was the same as in Example 1, but instead of circular pellets, the powders were compacted in layer form between graphite sheets into an asymmetric shape, which had the advantage that it could be inserted with only one side (that is polarity) into the receiving form. This is useful because it prevents mistakes in the orientation of the polarity of the battery on the device in which the battery is to be used. It is also useful since asymmetric receiving forms can be designed to receive battery power sources. The discharge behavior of this cell was the same as the cell of Example 1. When discharge had terminated, the cell was charged at much higher currents than in Example 1, the charging voltage being 1.521 volts dropped across a 22 kiloohm resistor. The cell was able to accept this fast charge mode and thereafter be usefully discharged.

EXAMPLE 10

In this Example 800 mg of hydroquinone were dissolved in 10 cc of deionized water containing 1.4 g of MPA. The pH of the plain MPA solution was about 1. Upon the addition of the hydroquinone, the solution turned from its yellowish color to dark greenish blue. 8 cc more of deionized water were added to this solution which was then heated on a hot plate at 37° C. with stirring. When nearly all of the water had evaporated, the stirring was terminated and the solution was allowed to dry to completion. The resulting dry material (Y) was dark blue. An anode mix containing in weight per cent: 33% Y, 8% graphite and 59% MPA, was used to construct a cell as in Example 1. This cell had an open circuit voltage of 0.455 volts and was usefully discharged under the conditions described in Example 1.

EXAMPLE 11

A one square cm area cell was built similar to the cell of Example 8 using a solid TPA/PVA membrane (80 microns thick) as the proton conducting electrolyte. The cathode, 125 microns thick, included of a mixture of manganese sulphate mono-hydrate as the active material, Shawinigan black carbon as the electronically conductive additive, and 4M sulphuric acid as the proton conducting additive. The anode, 125 microns thick, included tungsten trioxide as the active anodic material, Shawinigan black carbon as the electronically conductive additive (the tungsten trioxide to carbon weight ratio was 4 to 1), and 4M sulphuric acid as the proton conducting additive. The cell was charged and discharged at the 8 C rate at ambient temperature for several hundred cycles. The average working voltage on discharge was about 1.2 volts.

EXAMPLE 12

A cell was constructed using the anode, electrolyte and cathode compositions as in Example 1, but the graphite foil end plate, anode mix, electrolyte, cathode mix and graphite foil end plate were pressed sequentially inside a flexible plastic tube to form a bipolar battery. The bipolar current collector was the graphite foil as in Example 2. In this manner, a multi-cell battery was constructed having an open circuit voltage which was the sum of the individual cell voltages. In this way batteries with voltages of greater than 2 volts were prepared. Individual cell voltages were of the order of 0.565 volts. The advantage of using a flexible plastic robe for the battery housing was that the battery was flexible.

EXAMPLE 13

A cell was built as in Example 11 but the tungsten trioxide was replaced with antimony oxide as the anodic active material. Cells were tested as in Example 11 and gave 80 watt-hours/liter nominal energy density and cycled for 50 cycles. The average working voltage on discharge was about 1.2 volts.

EXAMPLE 14

A battery cell was constructed as in Example 1, except that the molybdophosphoric acid (MPA) was replaced by tungstophosphoric acid (TPA) in the anode and cathode mixes and non-liquid electrolyte. The weight per cent composition in the anode and cathode mixes was the same, but the amount of TPA used for the electrolyte was 493 mg. The open circuit voltage of this cell was 0.591. It was discharged using the same conditions as in Example 1 to provide useful energy.

EXAMPLE 15

The procedure described in Example 1 was repeated to prepare cells. The anode mix consisted of the following weight percentages: 33.3% THQ, 8.3% MPA and 58.3% graphite powder. The cathode consisted of 75% electrolytic manganese dioxide, 21% MPA and 4% graphite powder. The typical particle diameter of the graphite powder was about 6 microns. The insulating sleeve of the 12 mm diameter die in this example is anodized aluminum. The anodizing treatment created a highly electrically insulating and smooth layer on the surface of the aluminum die block. Cells were pressed at one ton.

Typical open circuit voltages of cells with the above composition are about −0.790 to +0.780 volts. Such cells were discharged on continuous drains across resistive loads corresponding to current densities in the range from 0.13 to 7 mA per square centimeter with working voltages of about 0.720 to 0.550 volts, respectively. Pulse current densities of 9 mA per square centimeter at voltages greater than +0.400 volts can be achieved with this cell. Repeated discharge-charge cycles were performed with the charging performed by dropping 1.5 volts across a 16 kiloohm resistor in series with the cell.

EXAMPLE 16

It is known from the prior art that the conductivity of the MPA electrolyte is dependent on the amount of hydrated water molecules contained in its crystal structure. At typical room conditions some of this water may be lost from the MPA. Cells built in accordance with Example 15 were sealed around their periphery to prevent possible water loss. Sealing the periphery of cells can be accomplished either by water impermeable film barriers such as by the commercial product which is sold under the trade name "Parafilm" or appropriate glues, lacquers, or polymer solutions which, when dried or polymerized, act to prevent water loss. In this way, water loss was essentially eliminated from the MPA electrolyte constructed into the cells.

EXAMPLE 17

Further to Example 16, a proton conducting water impermeable barrier or sealant can be introduced into the heteropolyacid electrolyte directly. In one version, a Nafion solution is mixed with the non-liquid electrolyte powder mix and then the Nafion is allowed to set up. The Nafion acts as a water barrier around the powder grains to prevent water loss. In other versions, other sealants can be dry-mixed with the electrolyte powder to coat the powder grains. In yet other variations, the Nafion was applied to the external faces of pressed pellets of the electrolyte to prevent water loss.

EXAMPLE 18

Cells can be made according to the various methods described in the above Examples.

In order to build battery packs consisting of a number of cells it is desirable to fill all the available volume within the pack with cells without any unused space. In order to do this, since some packs have unusual shapes, the size and shape of the cells need to conform to the internal dimensions of the pack. In order to do this, cells can be cut into the desired shapes. The cutting needs to be performed without short circuiting the cells. For instance, a blade which is not electrically conductive can be used, laser or other types of energy beams, or other methods. This eliminates the need for a range of dies for each individual shape cell and facilitates mass production of various shaped batteries.

EXAMPLE 19

Some of the organic compounds described herein for anode active materials might move towards the cathode thorough the electrolyte and cause some degree of self-discharge. In order to prevent this, the active materials can be set in polymers or polymerized to prevent their movement through the electrolyte. Separator barriers such as, but not limited to, those based on cellophane can also be inserted into the electrolyte to prevent migration.

EXAMPLE 20

In order to catalyze the protonic reaction at the anode during discharge and charge of the cell, various catalysts can be added to the anode mix. For instance, a 10% palladium hydrogenation catalyst on activated carbon can be added to the anode mix. For one skilled in the art, it is apparent that other catalysts can also be chosen.

EXAMPLE 21

Hygroscopic materials can be mixed with the acid electrolyte in order to minimize loss of hydrated water from the heteropolyacid. In this way, the hydrated water of the heteropolyacid is maintained. In one version, a hygroscopic salt such as calcium chloride was mixed with the heteropolyacid. One skilled in the art would be able to envision many other hygroscopic materials which one can use for this purpose.

EXAMPLE 22

As an example of a cathodic active material with perovskite sub-structures, a cell was built as in Example 15 except that the cathode consisted of 38 weight per cent $Bi_2Sr_2Cu_1O_{6+y}$ obtained from SSC Inc., 58 w/o MPA, and 4 w/o graphite powder. The initial open circuit was low, only 0.285 volts, and so no further measurements were conducted.

EXAMPLE 23

As an example of a cell whose anode contains a non-aromatic ring proton donating compound, a cell was bit and discharged as in Example 15 except that the active anodic material consisted of Quinic acid. The initial open circuit voltage was 0.502 volts. Discharge under these conditions led to fast polarization of the cell voltage.

EXAMPLE 24

As another example of a cell whose anode contains a non-aromatic ring proton donating compound, a cell was built as in Example 15 except that the active anodic material consisted of scyllo-Inosose. The initial open circuit voltage was 0.515 volts. No further measurements were conducted.

EXAMPLE 25

Hexahydroxy benzene was synthesized using standard chemical procedures as described in "Organic Syntheses, Collective Volume 5", John Wiley and Sons, New York, pp. 595–7. Cells were built as in Example 15 with hexahydroxy benzene as the active anodic material. The open circuit voltage is 0.9 volts. Cells were discharged at about 0.7 mA per square centimeter. The discharge curve was slightly sloping to 0.6 volts to give useful energy and thereafter fell off more quickly.

EXAMPLE 26

As an example of a cell whose cathode contains a non-proton accepting compound containing a metal ion whose cation can assume at least two different non-zero oxidation numbers, cells were built as in Example 15 except that the active cathodic material consisted of 87.5 w/o $MnSO_4$-1 $H_2O$, 8.5 w/o MPA and 4 w/o Texas Shawinigan carbon black. The cells were first charged at 2 mA current and then discharged at room temperature on the following loads. Capacity data is given below:

| Load, ohms | Capacity, mAH | C rate |
| --- | --- | --- |
| 1,000 | 7.6 | 0.13 |
| 500 | 7.3 | 0.26 |
| 237 | 6.8 | 0.53 |
| 100 | 5.6 | 1.32 |

The effect of temperature was evaluated for cells charged as above and discharged on 1,000 ohms.

| Temperature, degrees Celsius | Capacity, mAH |
| --- | --- |
| 4 | 7.1 |
| 22.5 | 7.6 |
| 55 | 4.3 |

The effect of charging rate was evaluated for cells discharged on 1,000 ohms at room temperature.

| Charging current | C rate | Capacity, mAH |
| --- | --- | --- |
| 0.5 | 0.07 | 7.8 |
| 2 | 0.26 | 7.6 |
| 4.75 | 0.63 | 8.0 |
| 6 | 0.79 | 6.4 |
| 9.45 | 1.24 | 4.2 |

At the C/8 discharge rate, cells provided 370 partial discharge cycles without exceeding more than 20% capacity fade relative to the initial capacity.

EXAMPLE 27

Cells were built and tested as in Example 26 with cathodes of $MnSO_4$-1 $H_2O$ and triquinoyl as the active anode material. Initial charging was performed at 2 mA to obtain the indicated anode reaction product and then cells were discharged across a 1,000 ohm load. Results are given below. Anodic product abbreviations are defined in Example 26.

| Nominal electron change | Intended anodic product | Discharge mAH | avg. CCV |
| --- | --- | --- | --- |
| 2 | RDZ | 6.2 | 0.9 volts |
| 4 | THQ | 6.7 | 0.9 volts |
| 6 | HHB | 6.9 | 0.9 volts |

EXAMPLE 28

Cells were built and tested as in Example 27 using RDZ as the active anodic material. Results are summarized below.

| Nominal electron change | Intended anodic product | Discharge mAH | avg. CCV |
| --- | --- | --- | --- |
| 2 | THQ | 7.7 | 0.85 volts |
| 4 | HHB | 8.2 | 0.85 volts |

EXAMPLE 29

As an example of a cell whose anode contains a non-proton donating compound containing a metal ion whose cation can assume at least two different non-zero oxidation numbers, cells were built with a THQ active material cathode and $SnSO_4$ active material anode. The open circuit voltage was about 0.2 volts.

EXAMPLE 30

Cells were built as in Example 30 but with 7 w/o of $MnSO_4$-1 $H_2O$ substituted with $Bi_2O_3$. Cells were discharged at 0.13 C rate to 16% depth of discharge and charged at 0.26 C rate. After 51 cycles there was only a 7% capacity fade from the initial capacity.

EXAMPLE 31

As an example of a cell which contains an aqueous solution of an acid as the proton conducting additive to the electrodes and a membrane form electrolyte, cells were built with the following construction. The anode composition is: 69 w/o THQ, 16 w/o Shawinigan carbon black, 15 w/o 1N sulphuric acid. The cathode composition is: 85 w/o $MnSO_4$-1 $H_2O$, 8 w/o Shawinigan carbon black, 7 w/o 1N sulphuric acid. Due to the high surface area of the carbon, the electrode mixes remain as free flowing powders with a dry appearance. The electrolyte was formed by dissolving TPA in an aqueous poly-vinyl alcohol solution and casting it into a thin film. The anode and cathode mixes were pressed against the electrolyte film to make the cell. The initial charge was carried out at the 0.1 C rate and then discharged at the 0.05 C rate. The energy density under these conditions ranged between 140 and 180 watt-hours/liter.

EXAMPLE 32

As another example of a cell which contains an aqueous solution of an acid as the proton conducting additive to the electrodes and a membrane form electrolyte, cells were built as in Example 31 with the following composition. The anode composition is a 1:1 by weight mixture of THQ/Shawinigan carbon black wetted with an aqueous solution of sulphuric acid. The cathode composition is a 3:1 by weight mixture of $MnSO_4$-1 $H_2O$/Shawinigan carbon black wetted with an aqueous solution of sulphuric acid. The electrolyte membrane is a chlorosulfonated polyethylene. Cells were charged and fully discharged at the 0.3 C rate. The discharge voltage was flat and remained above 1 volt for about 80% of the depth of discharge. Cells discharged at the 1 C rate gave high capacities.

EXAMPLE 33

Cells were built as in Example 32 but with cathodes whose active material was substituted by 10 w/o of a strong cation form exchanger powder in the hydrogen ion form. It is sold commercially as Dowex 50WX8. This cathode composition gives improved cycling behavior.

EXAMPLE 34

As another example of a cell whose cathode contains a non-proton accepting compound containing a metal whose cation can assume at least two different non-zero oxidation numbers, a cell was built as in Example 26 except that the active cathodic material consisted of $Ce_2(SO_4)_3$. After the initial charge, the open circuit voltage was 0.575 volts. No further tests were performed.

EXAMPLE 35

A cell was built as in Example 11 but the tungsten trioxide was replaced with tin oxide as the anodic active material. Cells were tested as in Example 11 and cycled for several hundred cycles at a nominal working voltage of 1.7 volts. The theoretical energy density of this electrode couple is 2,394 watt-hours per liter.

EXAMPLE 36

A cell was built as in Example 11 but (a) the TPA/PVA membrane was replaced with a membrane of PVA/Dowex50WX8 cation exchanger in a weight ratio of about 1:1, and (b) the anode was chloranillic acid as in Example 11 and cycled for 400 cycles with very high coulombic efficiency.

EXAMPLE 37

A nine square centimeter area cell was built as in Example 11 but the tungsten trioxide was replaced with chloranillic acid as in Example 8 as the anodic active material. The cell was tested initially at a 4 C rate of charge and discharge to establish base line behavior. Then the cell was cycled at a 57 C rate. At the 57 C rate the discharge capacity roll off was only 51% relative to the 4 C capacity data.

EXAMPLE 38

One square centimeter area cells were built as in Example 37 but the cathode active material was prepared as follows. Spinel of nominal formula substantially $LiMn_2O_4$ was repeatedly washed in 4M sulphuric acid until there was no longer any color change in the acid supernatant after vigorous stirring. Cells constructed with this material as the active cathode cycled at 4 mA charge and discharge currents for tens of cycles.

While the invention has been described with respect to a limited number of embodiments, it will be appreciated that many variations, modifications and other applications of the invention may be made.

What is claimed is:

1. A battery comprising an anode, a cathode and a non-liquid electrolyte between, and in contact with, the anode and cathode, wherein:
   (a) said anode includes an organic compound which is a source of protons during discharge;
   (b) said cathode includes a compound which forms an electrochemical battery couple with the anode; and
   (c) said electrolyte includes a non-liquid material in which protons are mobile.

2. A battery as in claim 1, wherein at least one of said anode and cathode further includes a proton conducting material.

3. A battery as in claim 2, wherein said proton conducting material is in a form selected from the group of forms consisting of a solid, a solution, a gel and a polymer.

4. A battery as in claim 3, wherein said solution is an aqueous acid solution.

5. A battery as in claim 4, wherein said aqueous acid solution is selected from the group consisting of sulfuric acid, methane sulfonic acid, nitric acid, hydrofluoric acid, hydrochloric acid, phosphoric acid, $HBF_4$, perchloric acid and pyrophosphoric acid.

6. A battery as in claim 3, wherein said solution is a liquid which includes:
   (a) a solvent selected from the group consisting of a protic solvent and a non-aqueous aprotic solvent; and
   (b) an acidic compound.

7. A battery as in claim 1, wherein said organic compound contained in said anode is selected from the group of organic compounds consisting of hydroquinone, phloroglucinol, echinochrome, 1,2,5,8-tetrahydroxyanthraquinone, purpogallin, methylenedigallic acid, 2,5-dihydroxy-1,4-benzoquinone, resorcinol, ascorbic acid and its derivatives; tetrahydroxy napthalene, tetrahydroxy 1,4-naphthaquinone, pentahydroxy 1,4-naphthaquinone, phenolphthalein, indophenol, bromophenol blue, oxindole, o-phenanthroline, phenanthridine, 6(5H)-phenanthridinone, uracil, 2-amino-5-bromopyridine, 5-aminotetrazole monohydrate, 2-aminothiazole, 2-aminopyrimidine, 2-amino-3-hydroxypyridine, 2,4,6-triaminopyrimidine, 2,4-diamino-6-hydroxy pyrimidine, 5,6-diamino-1,3-dimethyhracil hydrate, 5,6-diamino-2-thiouracil, cyanuric acid, cyanuric acid compound with melamine, 1,2-diaminoanthraquinone and 3-amino-2-cyclohexen-1-one, methylene blue, hydroxy acetophenone, acetaminophen hydroxybenzyl alcohol, dopamine, pyrogallol, naphthols, anthranol, hydroxy anthraquinone, anthralin, anthragallol, anthrarufin, anthrobin, purpurin, tetrahydroxybenzophenone, 1,8,9-anthracenetriol, carminic acid, hydroquinone monomethyl ether, citrazinic acid, hydroxybenzophenone, hydroxy biphenyl, tetrahydro papaveroline, fustin, hydroquinone monobenzylether hydroxymethyl pyridine, squaric acid, tetrahydroxy acetophenone, tetrahydroxy benzoic acid, Rhodizonic acid, croconic acid, hexahydroxy benzene, reductic acid, 5-methyl reductic acid, calix(4)arene, chloranilic acid and tetrahydroxy quinone.

8. A battery as in claim 1, wherein said organic compound contained in said anode is selected from the group consisting of the non-hydrated and the hydrated forms of those compounds.

9. A battery as in claim 1, wherein said organic compound contained in said anode is selected from the group consisting of tetrahydroxy quinone, hexahydroxybenzene, chloranilic acid, a reduced form of chloranilic acid, chloranil, rhodizonic acid, fluoroanilic acid, a reduced form of fluoroanilic acid, fluoranil and duroquinone.

10. A battery as in claim 1, wherein said organic compound contained in said anode is a proton-donating non-aromatic ring compound.

11. A battery as in claim 1, wherein said organic compound contained in said anode is a solid state proton-donating chain compound.

12. A battery as in claim 1, wherein said organic compound contained in said anode has both proton-donating and proton-accepting groups.

13. A battery as in claim 1, wherein said organic compound contained in said anode is a quinone.

14. A battery as in claim 1, wherein said organic compound contained in said anode is a polymer.

15. A battery as in claim 1, wherein said anode further includes a catalyst for catalyzing battery anodic reactions.

16. A battery as in claim 1, wherein said anode further includes at least one compound which includes a metal whose cation can assume at least two different non-zero oxidation numbers.

17. A battery as in claim 16, wherein said metal is selected from the group consisting of Ti, Cu, Sn, Al, Cr, W, Sb, Ir, Mo and Bi.

18. A battery as in claim 1, wherein said non-liquid material in which protons are mobile includes a substance selected from the group consisting of a heteropolyacid in its hydrated form, a heteropolyacid in its non-hydrated form, a polymer-heteropolyacid blend, a single phase substance made of a heteropolyacid and a polymer, a multi-component substance which includes a heteropolyacid and a polymer, an anion exchanger which does not block protons, an anion adsorber which does not block protons, a cation adsorber, cation exchange materials, including their hydrogenated forms, chloro-sulfonated polyethylene, sulfonated polystyrene, sulfonated polysulfones and copolymers based on these materials, a perfluoronated sulfuric acid cation exchanger, cellulose acetate and cellulose triacetate membrane.

19. A battery as in claim 1, wherein said non-liquid material in which protons are mobile includes a substance selected from the group consisting of an ion exchange material and an ion adsorber material.

20. A battery as in claim 18, wherein said heteropolyacid is selected from the group consisting of molybdophosphoric acid, tungstophosphoric acid, molybdosilicic acid and tungstosilicic acid.

21. A battery as in claim 18, wherein said polymer is polyvinyl alcohol.

22. A battery as in claim 21, wherein said polyvinyl alcohol polymer is in a form selected from the group of forms consisting of a fully hydrolyzed form and a partially hydrolyzed form.

23. A battery as in claim 21, wherein said polyvinyl alcohol polymer has a molecular weight in the range between about 15,000 and about 186,000.

24. A battery as in claim 1, wherein said non-liquid electrolyte further includes an electronically insulating metal oxide compound.

25. A battery as in claim 24, wherein said metal oxide includes a metal selected from the group consisting of Al, Si, Ce, Ti, Mg and Fe.

26. A battery as in claim 1, wherein said compound contained in said cathode is selected from the group consisting of the non-hydrated and the hydrated forms of those compounds.

27. A battery as in claim 1, wherein said compound contained in said cathode is selected from the group consisting of transition metal dichalcogenides, NiOOH, naphthalene, polycarbon fluoride, polydicarbon fluoride, $Ni(OH)_2$, monovalent silver oxide, divalent silver oxide, tantalum oxide, molybdenum trioxide, niobium triselenide, $Bi_2Sr_2CaCu_2O_{8+y}$, $Bi_2Sr_2Cu_1O_{6+y}$, $YBa_2Cu_3O_7$, fullerenes and a manganese compound.

28. A battery as in claim 27, wherein said manganese compound is selected from the group consisting of manganese sulfate in its hydrated forms, manganese sulfate in its non-hydrated form, manganese dioxide in its chemical form, manganese dioxide in its electrolytic form, manganese dioxide in its natural form, lambda manganese dioxide and a manganese compound which is made by treating a spinel lithium manganese oxide of a nominal formula $LiMn_2O_4$ to remove the lithium.

29. A battery as in claim 1, wherein said compound contained in said cathode is $MnSO_4$-x $H_2O$, where x is an integer in the range of from 0 to 7.

30. A battery as in claim 1, wherein said compound contained in said cathode is $MnSO_4$-x $H_2O$, where x is zero or one.

31. A battery as in claim 1, wherein said compound contained in said cathode includes a metal whose cation can assume at least two different non-zero oxidation numbers.

32. A battery as in claim 31, wherein said metal is selected from the group consisting of Mn, Ce, Fe and Co.

33. A battery as in claim 1, wherein said cathode further includes a material selected from the group consisting of a cation exchange material and a cation adsorber material.

34. A battery as in claim 1, wherein said compound contained in said cathode is selected from the group consisting of a cation exchange material and a cation adsorber material treated with a solution containing a substance selected from the group consisting of Mn, Ce, Fe and Co salts and non-salt compounds.

35. A battery as in claim 1, wherein said compound contained in said cathode can function as a proton-donator and a proton-acceptor.

36. A battery as in claim 1, wherein said compound contained in said cathode is a polymer.

37. A battery as in claim 1, wherein said cathode further includes a catalyst for catalyzing battery cathodic reactions.

38. A battery as in claim 1, wherein said cathode includes manganese sulfate and carbon, and wherein said anode includes chloranilic acid and carbon.

39. A battery as in claim 1, wherein said compound contained in said cathode is selected from the group consisting of a non-hydrated form and hydrated forms of manganese sulfate, and wherein said compound contained in said anode is selected from the group consisting of a non-hydrated form and hydrated forms of chloranilic acid.

40. A battery as in claim 1, wherein at least one of said anode and cathode further includes an electrically conductive material.

41. A battery as in claim 40, wherein said electrically conductive material is selected from the group consisting of graphite, activated carbons and carbon materials.

42. A battery comprising an anode, a cathode and a non-liquid electrolyte between, and in contact with, the anode and cathode, the battery operating under ambient conditions, wherein:
  (a) said anode includes at least one material which includes a metal whose cation can assume at least two different non-zero oxidation numbers, said anode further includes a catalyst for catalyzing battery anodic reactions;
  (b) said cathode includes a compound which forms an electrochemical battery couple with the above anode; and
  (c) said electrolyte includes a non-liquid material in which protons are mobile.

43. A battery as in claim 42, wherein at least one of said anode and cathode further includes a proton conducting material.

44. A battery as in claim 43, wherein said proton conducting material is in a form selected from the group of forms consisting of a solid, a solution, a gel and a polymer.

45. A battery comprising an anode, a cathode and a non-liquid electrolyte between, and in contact with, the anode and cathode, the battery operating under ambient conditions, wherein:
  (a) said anode includes at least one material which includes a metal whose cation can assume at least two different non-zero oxidation numbers;
  (b) said cathode includes a compound which forms an electrochemical battery couple with the above anode; and
  (c) said electrolyte includes a non-liquid material in which protons are mobile;
wherein at least one of said anode and cathode further includes a proton conducting material, said proton conducting material is an aqueous acid solution.

46. A battery as in claim 45, wherein said aqueous acid solution is selected from the group consisting of sulfuric acid, methane sulfonic acid, nitric acid, hydrofluoric acid, hydrochloric acid, phosphoric acid, $HBF_4$, perchloric acid and pyrophosphoric acid.

47. A battery as in claim 45, wherein said metal is selected from the group consisting of Sn, Ti, Cu, Cr, Al, W, Sb, Ir, Mo and Bi.

48. A battery as in claim 45, wherein said material contained in said anode is selected from the group consisting of the non-hydrated and the hydrated forms of those materials.

49. A battery as in claim 45, wherein said material contained in said anode is a polymer.

50. A battery as in claim 45, wherein said anode further includes a material selected from the group consisting of a cation exchange material and a cation adsorber material.

51. A battery as in claim 45, wherein said material contained in said anode is selected from the group consisting of a cation exchange material and a cation adsorber material treated with a solution containing a substance selected from the group consisting of Sn, Cu, Ti, Cr, Al, W, Sb, Ir, Me, and Bi salts and non-salt compounds.

52. A battery as in claim 45, wherein said non-liquid material in which protons are mobile includes a substance selected from the group consisting of a heteropolyacid in its hydrated form, a heteropolyacid in its non-hydrated form, a polymer-heteropolyacid blend, a single phase substance made of a heteropolyacid and a polymer, a multi-component substance which includes a heteropolyacid and a polymer, an anion exchanger which does not block protons, an anion adsorber which does not block protons, a cation adsorber, cation exchange materials, including their hydrogenated forms, chloro-sulfonated polyethylene, sulfonated polystyrene, sulfonated polysulfones and copolymers based on these materials, a perfluoronated sulfuric acid cation exchanger, cellulose acetate and cellulose triacetate membrane.

53. A battery as in claim 52, wherein said heteropolyacid is selected from the group consisting of molybdophosphoric acid, tungstophosphoric acid, molybdosilicic acid and tungstosilicic acid.

54. A battery as in claim 52, wherein said polymer is polyvinyl alcohol.

55. A battery as in claim 54, wherein said polyvinyl alcohol polymer has a molecular weight in the range between about 15,000 and about 186,000.

56. A battery as in claim 54, wherein said polyvinyl alcohol polymer is in a form selected from the group of forms consisting of a fully hydrolyzed form and a partially hydrolyzed form.

57. A battery as in claim 45, wherein said non-liquid material in which protons are mobile includes a substance selected from the group consisting of an ion exchange material and an ion adsorber material.

58. A battery as in claim 45, wherein said non-liquid electrolyte further includes an electronically insulating metal oxide compound.

59. A battery as in claim 58, wherein said metal oxide includes a metal selected from the group consisting of Al, Si, Ce, Ti, Mg and Fe.

60. A battery as in claim 45, wherein said compound contained in said cathode is selected from the group consisting of the non-hydrated and the hydrated forms of those compounds.

61. A battery as in claim 45, wherein said compound contained in said cathode includes a metal whose cation can assume at least two different non-zero oxidation numbers.

62. A battery as in claim 61, wherein said metal is selected from the group consisting of Mn, Ce, Fe and Co.

63. A battery as in claim 45, wherein said cathode further includes a material selected from the group consisting of a cation exchange material and a cation adsorber material.

64. A battery as in claim 45, wherein said compound contained in said cathode is selected from the group consisting of a cation exchange material and a cation adsorber material treated with a solution containing a substance selected from the group consisting of Mn, Ce, Fe and Co salts and non-salt compounds.

65. A battery as in claim 45, wherein said compound contained in said cathode can function as a proton-donator and a proton-acceptor.

66. A battery as in claim 45, wherein said compound contained in said cathode is a polymer.

67. A battery as in claim 45, wherein at least one of said anode and cathode further include an electrically conductive material.

68. A battery as in claim 67, wherein said electrically conductive material is selected from the group consisting of graphite, activated carbons and carbon materials.

69. A battery comprising an anode, a cathode and a non-liquid electrolyte between, and in contact with, the anode and cathode, the battery operating under ambient conditions, wherein:
   (a) said anode includes at least one material which includes a metal whose cation can assume at least two different non-zero oxidation numbers;
   (b) said cathode includes a compound which forms an electrochemical battery couple with the above anode; and
   (c) said electrolyte includes a non-liquid material in which protons are mobile;
wherein at least one of said anode and cathode further includes a proton conducting material, said proton conducting material is a solution which includes:
   (i) a solvent selected from the group consisting of a protic solvent and a non-aqueous aprotic solvent; and
   (ii) an acidic compound.

70. A battery comprising an anode, a cathode and a non-liquid electrolyte between, and in contact with, the anode and cathode, the battery operating under ambient conditions, wherein:
   (a) said anode includes at least one material which includes a metal whose cation can assume at least two different non-zero oxidation numbers, said anode further includes a substance selected from the group consisting of chloranilic acid, tetrahydroxy quinone, phenol, catechol, hydroquinone, 3,4,5-trichloro salicylanilide and tetrachloro salicylanilide;
   (b) said cathode includes a compound which forms an electrochemical battery couple with the above anode; and
   (c) said electrolyte includes a non-liquid material in which protons are mobile.

71. A battery comprising an anode, a cathode, and a non-liquid electrolyte between, and in contact with, the anode and cathode, the battery operating under ambient conditions, wherein:
   (a) said anode includes at least one material which includes a metal whose cation can assume at least two different non-zero oxidation numbers;
   (b) said cathode includes a compound which forms an electrochemical battery couple with the above anode; and (c) said electrolyte includes a non-liquid material in which protons are mobile;

wherein said compound contained in said cathode is selected from the group consisting of transition metal dichalcogenides, NiOOH, naphthalene, polycarbon fluoride, polydicarbon fluoride, $Ni(OH)_2$, monovalent silver oxide, divalent silver oxide, tantalum oxide, molybdenum trioxide, niobium triselenide, $Bi_2Sr_2CaCu_2O_{8+y}$, $Bi_2Sr_2Cu_1O_{6+y}$, $YBa_2Cu_3O_7$, fullerenes and a manganese compound.

72. A battery as in claim 71, wherein said manganese compound is selected from the group consisting of manganese sulfate in its hydrated forms, manganese sulfate in its non-hydrated form, manganese dioxide in its chemical form, manganese dioxide in its electrolytic form, manganese dioxide in its natural form, lambda manganese dioxide and a manganese compound which is made by treating a spinel lithium manganese oxide of a nominal formula $LiMn_2O_4$ to remove the lithium.

73. A battery comprising an anode, a cathode and a non-liquid electrolyte between, and in contact with, the anode and cathode, the battery operating under ambient conditions, wherein:
  (a) said anode includes at least one material which includes metal whose cation can assume at least two different non-zero oxidation numbers;
  (b) said cathode includes a compound which forms an electrochemical battery couple with the above anode; and
  (c) said electrolyte includes a non-liquid material in which protons are mobile;

wherein said compound contained in said cathode is $MnSO_4$-x $H_2O$, where x is an integer in the range of from 0 to 7.

74. A battery as in claim 73, wherein said integer is zero or one.

75. A battery comprising an anode, a cathode and a non-liquid electrolyte between, and in contact with, the anode and cathode, the battery operating under ambient conditions, wherein:
  (a) said anode includes at least one material which includes a metal whose cation can assume at least two different non-zero oxidation numbers;
  (b) said cathode includes a compound which forms an electrochemical battery couple with the above anode, said cathode further includes a catalyst for catalyzing battery cathodic reactions; and
  (c) said electrolyte includes a non-liquid material in which protons are mobile.

* * * * *